United States Patent
Kurth et al.

(10) Patent No.: US 6,865,612 B2
(45) Date of Patent: Mar. 8, 2005

(54) METHOD AND APPARATUS TO PROVIDE HIGH PRECISION PACKET TRAVERSAL TIME STATISTICS IN A HETEROGENEOUS NETWORK

(75) Inventors: Gerold Kurth, Boeblingen (DE); Andreas Maier, Stuttgart (DE); Volker Schoelles, Schoenaich (DE)

(73) Assignee: International Business Machines Corporation, Armonk, NY (US)

( * ) Notice: Subject to any disclaimer, the term of this patent is extended or adjusted under 35 U.S.C. 154(b) by 782 days.

(21) Appl. No.: 09/784,543

(22) Filed: Feb. 15, 2001

(65) Prior Publication Data

US 2001/0016876 A1 Aug. 23, 2001

(30) Foreign Application Priority Data

Feb. 19, 2000 (EP) .......................................... 00103586

(51) Int. Cl.[7] ............................................ G06F 15/173
(52) U.S. Cl. ...................... 709/238; 709/203; 709/224
(58) Field of Search .................................. 709/238, 203, 709/239, 217, 218, 219, 224

(56) References Cited

U.S. PATENT DOCUMENTS

| | | | | |
|---|---|---|---|---|
| 5,424,746 A | * | 6/1995 | Schwab et al. | 342/49 |
| 6,321,264 B1 | * | 11/2001 | Fletcher et al. | 709/224 |
| 6,512,761 B1 | * | 1/2003 | Schuster et al. | 370/352 |
| 6,567,929 B1 | * | 5/2003 | Bhagavath et al. | 714/18 |

* cited by examiner

*Primary Examiner*—Mehmet B. Geckil
(74) *Attorney, Agent, or Firm*—Floyd A. Gonzalez, Esq.; Kevin P. Radigan, Esq.; Heslin Rothenberg Farley & Mesiti, P.C.

(57) ABSTRACT

The present invention relates to handling of performance problems arising in computer networks and in particular, to precise definition of packet traversal time. The basic idea of the present invention comprises the principle to perform a calibration phase, in which the difference between the computer clocks on the client and the server computer is calculated, using a statistical method. This allows to calculate request and response time separately.

25 Claims, 3 Drawing Sheets

METHOD AND APPARATUS TO PROVIDE HIGH PRECISION PACKET TRAVERSAL TIME STATISTICS IN A HETEROGENEOUS NETWORK

PRIOR FOREIGN APPLICATION

This application claims priority from European patent application number 00103586.4, filed Feb. 19, 2000, which is hereby incorporated herein by reference in its entirety.

TECHNICAL FIELD

The present invention relates to handling of performance problems arising in computer networks having a large amount of traffic between a plurality of client computers and a number of associated server computers. In particular, it relates to precise determination of packet traversal time.

BACKGROUND ART

In modern business environments there is often a situation found in which an end-user does some business relevant work on a so-called client computer which is connected to one or more dedicated server computers, as e.g., a file server, a database server in a heterogenous network comprising PC, workstation and mainframe computers.

In particular, when data is sent from the client to one predefined server over the network the transfer is called a 'request' to said server for getting some data back. Or, when the client-requested data is sent back from the server to the client the transfer is called a 'response'. In this manner traffic is generated in the network. The data is usually sent 'wrapped' in packets, the regular packet size being dependent of the actual network protocol in use. The packets are routed through the network driven by the computing resources of the router computers.

A considerable portion of working time, however, is waisted when the end-user has to wait too long until he receives the requested data back from the server. When more than one, e.g., 20 serial request/response pairs result from only one user-initiated unit of work, transaction, etc., then, those 20 requests must be completed in order to terminate the end-user's waiting period. In such a case any additional network delay, e.g., because of network problems, is amplified by this factor, e.g. 20, so even small additional network delays in the milliseconds range can easily add up to time ranges visible to the end user.

In the case of batch workloads, there are often millions of serial request/response pairs in a single batch job, so that this effect may have dramatic dimensions.

Thus, it is a general task to observe the speed of traffic in the network and to realize quickly when there are network performance problems which yield to such waste of time. Then, any measure can be undertaken in order to solve the underlying technical problem.

A prior art approach for doing this task is a piece of software, one part of it being installed as a middleware program at the server side, and the counterpart being installed at the client side. It is the network statistics function of the currently delivered ICLI component of OS/390, described in the IBM book "SAP R/3 on DB2 for OS/390: Planning Guide, SAP R/3 Release 4.6A", SC33-7964-01, published September 1999 (which is hereby incorporated herein by reference in its entirety), the basic way of operation of which is illustrated with reference to FIG. 1.

The client time scale is depicted with the left arrow and the server time scale with the right arrow. Both clocks have an undefined time lag as—in most cases they are not synchronized—which is not depicted in the drawing. Said time lag can be considered as quasi-constant because the long time variation of the time lag can in most cases be neglected.

At the client time T1 the client sends a request to the server. Said request is received at server time U2 at the server. Then the request is processed during a duration Ds and is sent back to the client at server time U3. Thus, the server processing time Ds is Ds=U3−U2. Then, the response data is receceived at the client side at the client time T4. Thus, the client program 'sees' a time difference of T4−T1 which it has to wait until it receives the desired response. Said total time difference splits up in three portions: Dq+Ds+Dp.

The server (processing) time Ds spent on the server side is sent back to the client as a part of the response data. The client subtracts the server time Ds from the time it observes between having sent the request data—T1—and having received the response data—T4. The result is the total time D spent in the network, or in other words, the total of request time Dq and response time Dp.

The network time is then used to apply some statistics to it, but this is not of primary interest with respect to the present inventional disclosure.

Realistic, just examplarily given values are as follows:

$D=Dq+Dp=0.8 \ldots 3$ msec $Ds=2 \ldots 200$ msec.

In case of network performance problems, either Dq or Dp or both could be enlarged significantly, there were observed values of 200 msec for instance.

A disadvantage of this prior art approach is that it is not precise enough as only the total of request time Dq and response time Dp can be used for diagnosing the network traffic problems. Such problems may occur just during the transfer from client to server or just from server to client. Knowing request and response times separately would help in identifying where a performance problem comes from.

SUMMARY OF THE INVENTION

Request time and response time are measured with a high precision (e.g. a few microseconds) because with today's connectivities, the data transfer times are in the range of a few hundred microseconds, and the precision of the measurement is supposed to be significantly smaller than the transfer time.

When improvements are envisaged to obviate the above mentioned disadvantage, i.e., to determine the request time and the response time separately, some general requirements and technical constraints are to be considered, however.

First, the entire times measurement is not to have a larger overhead as it is desired to collect statistics data about the transfer times all the time, i.e., permanently, in order to know always whether or not there is a performance problem. For performance data that is collected only during isolation of a performance problem, some more overhead might be acceptable, dependent on the respective case. For permanent monitoring, however, any overhead is prohibitive.

Second, there is not to be a requirement to synchronize the computer clocks of client and server to zero time difference because unsynchronized clocks is the most common case in heterogeneous networks. Besides that, computer clocks may diverge, i.e., said time difference may slowly change over time.

It is thus an object of the present invention to provide a method and system which is able to determine the request time and the response time separately.

These objects of the invention are achieved by the features stated in enclosed independent claims. Further advantageous arrangements and embodiments of the invention are set forth in the respective subclaims.

The basic idea of the present invention comprises the principle to have a calibration phase, in which the difference between the computer clocks on the client and server computer is calculated, using a statistical method. This allows to calculate request and response times separately.

In order to improve clarity when dealing with time differences and points in time on two different computer systems, a particular naming convention is followed as given next below:

Durations start with "D";
Names of points in time on the client computer start with "T";
Names of points in time on the server computer start with "U";
Names of clock differences between client and server clock start with "V".

The following paragraphs explain some of the formulas used for describing the invention mathematically.

$$V:=T-U$$

The difference between the clocks (V) is defined as the difference between any point in time using the units of the clock on the client (T) minus the point in time in units of the clock on the server (U).

$$Dq=T2-T1=U2+V-T1$$

If the clock difference (V) was known, the client could calculate the request time (Dq) from the observed time when the request was sent (T1) and the time U2 returned by the server.

$$Dp=D-Dq$$

Of course, once the request time is known, the response time can be calculated from it as well.

According to the present invention in addition to the server processing time (Ds), during a client/server clock calibration phase a number of for example N=100, or 200, or 300 requests are sent from the client to the server. The server processes said requests and sends repetitively information about the point in time (U2) when the request was actually received, in units of the clock residing on the server back to the client. Then, on the client side this information is used for statistically determining the clock difference with a sufficiently high precision.

The basic idea thus comprises to predict the point in time in units of the client clock the request will arrive on the server, and to compare this with the point in time in server clock units this actually happens. If this prediction is repeated sufficiently often and under sufficiently repeatable conditions, the statistical failure in the end result satisfies the required precision.

Further, the above-described method can also be performed in the 'opposite' way, i.e., controlled by the server. In this variation the server is the one who determines the clock difference by predicting the time it takes to send the response data back to the client.

BRIEF DESCRIPTION OF THE DRAWINGS

The present invention is illustrated by way of example and is not limited by the shape of the figures of the accompanying drawings in which.

BEST MODE FOR CARRYING OUT THE INVENTION

With general reference to the figures and with common reference now to FIG. 2 and FIG. 3 the basic technical situation underlying the present invention will be described as well as a preferred, exemplary embodiment of the inventional method.

Figure 1:
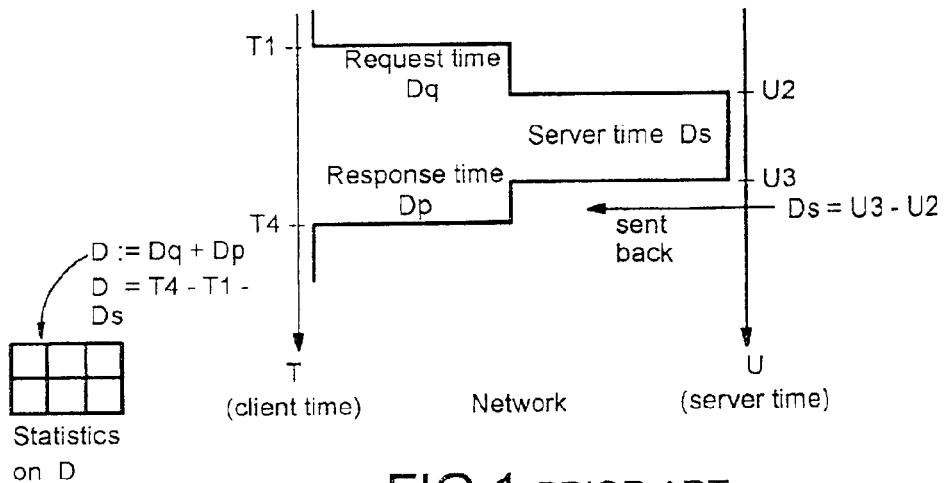
FIG. 1 is a schematic representation of the basic technical situation underlying the present invention and shows how this is solved with prior art technique.
Figure 2:
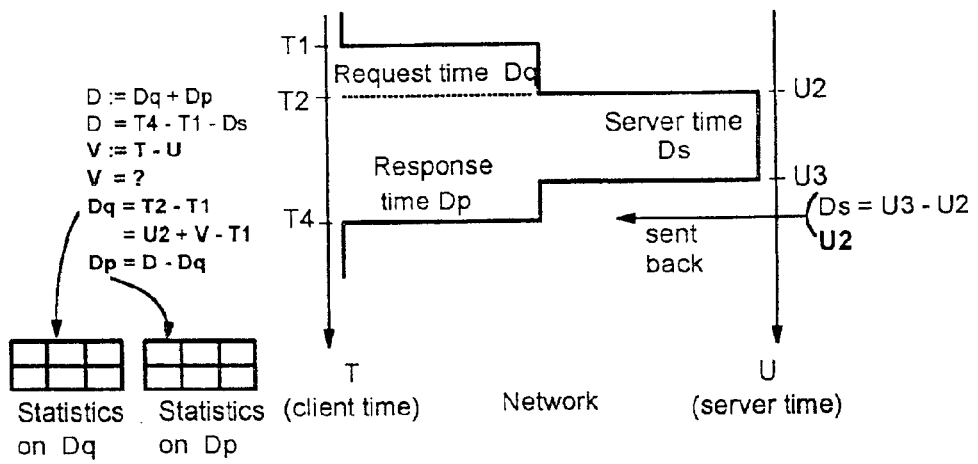
FIG. 2 is a representation according to FIG. 1 showing the solution according to the present invention, and FIGS. 3A, B are schematic block diagrams showing the control flow and various steps during determination of the clock difference between client and server.

Basically, FIG. 2 is similarly structured as FIG. 1. Thus, the same description as described above applies here, too.

As already mentioned above a key to determine Dq and Dp separately is to know the clock difference V=T−U. Then Dq can be calculated as Dq=T2−T1=U2+V−T1, and when Dq is known Dp can be calculated as Dp=D−Dq=T4−T1−Ds−Dq. These formulas are depicted in the left portion of the figure.

Figure 3A:
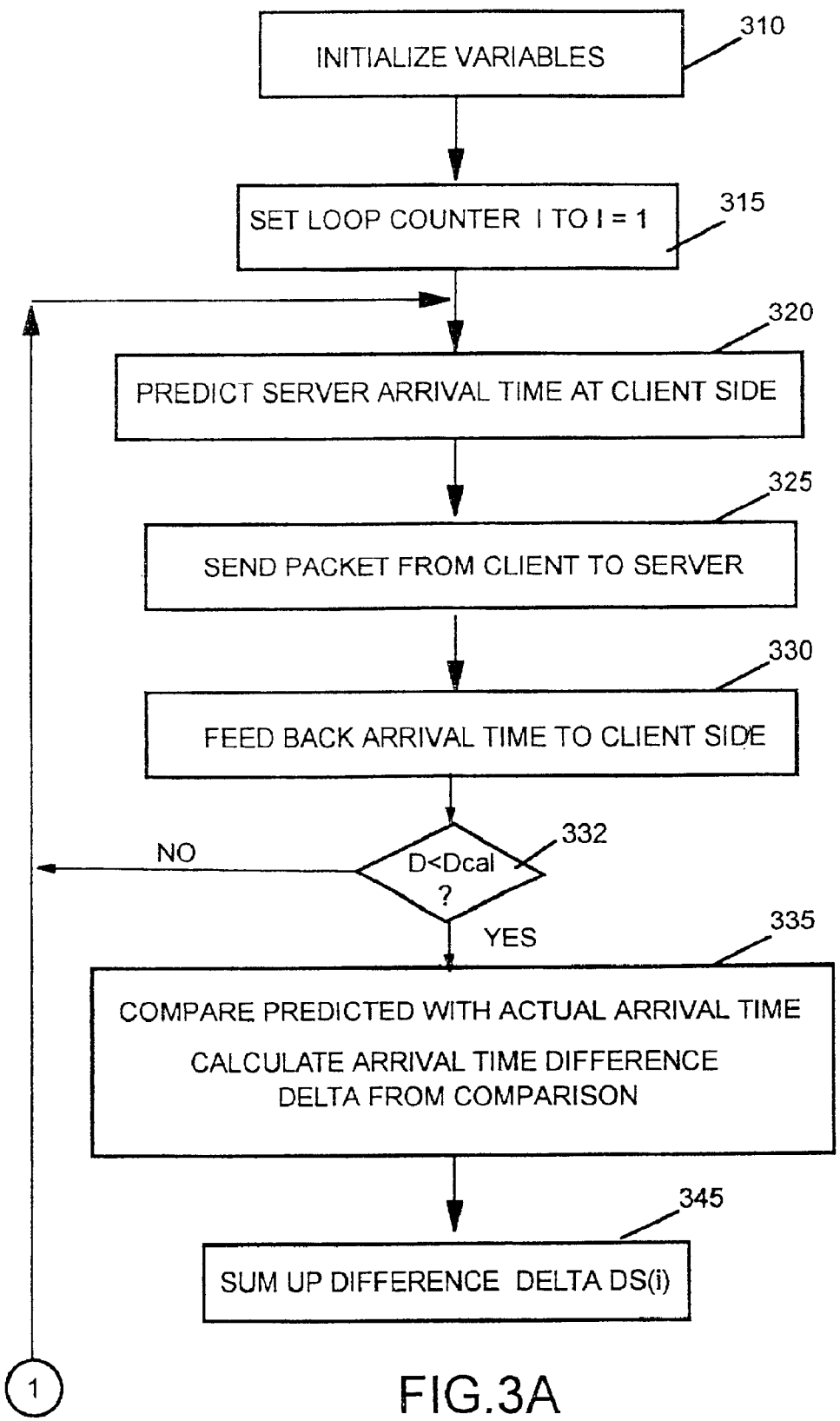

With reference now to FIG. 3A the control flow and the most essential steps during determination of the clock difference V between client and server time scales are described next below.

In a first step 310 the variables Dq(0) and V(0) are initialized with some starting values for an iterative calibration process. A starting value for the clock difference V of V(0)=T1(0)+Dq(0)−U2(0) is assumed to $$Dq(0)=Dmin/2$$

Any starting value would be tolerable, however, using the assumption that request and response time are equal, and therefore, request time is half of the total network time, in most cases results in the best starting value.

Dmin can for example be determined by evaluating the network time of a selected one of a series of appropriate test request/response pairs which were previously sent through the network, as it can be e.g., the shortest network time. These test pairs also need to return the server arrival time U2 as described further down, in order to be able to calculate V(0).

Then, step 315, the iteration loop counter i is set to i=1.

Further, in a step 320 the arrival time for the packet is estimated and predicted at the client side by aid of the starting value of Dq(0)=Dmin/2 as T1+Dmin/2 according to the formula U2pred(i)=T1(i)+Dq(0)−V(0) and according to client time scale T.

Then a test packet is sent from the client to the server according to FIG. 2, step 325.

Then, the request is processed at the server side and the response data is sent back from the server to the client. In the response the actual server arrival time U2 in units of the server clock is delivered within the packet for evaluation at the client side, step 330.

Further, in a step 332, a number of appropriate request/response pairs are selected, for example by defining that the network time of a pair to be selected is to be smaller than a predefined value Dcal. Dcal in turn should be defined such that a sufficiently large number of request/resonse pairs can be used for the calibration.

If the above defined condition is true, the current pair is selected for calibration, else it is branched back to the beginning of the loop, i.e., to step 320, whereby the current pair is not taken for calibration.

Then, in the YES branch, in a step 335, both arrival times are compared and the delta (d) between predicted request arrival time (U2pred) and actual request arrival time (U2) is determined.

Thus, the definition of the delta between the predicted request arrival time (U2pred) and the actual request arrival time (U2) is d:=U2pred−U2.

Then, in a step 345, the delta value d(i) is stored and the accumulating sum ds(i), i.e., the sum of the delta values from each iteration cycle is stored and updated in order to calculate the average value of the plurality of appropriate delta values d(i) later on. For the reader's convenience the following formulae are given:

$$d(i)=U2\text{pred}(i)-U2(i)=T1(i)+Dq(0)-V(0)-U2(i)=T1(i)+U2(0)-T1(0)-U2(i)=(T1(i)-U2(i))-(T1(0)-U2(0)).$$

Figure 3B:
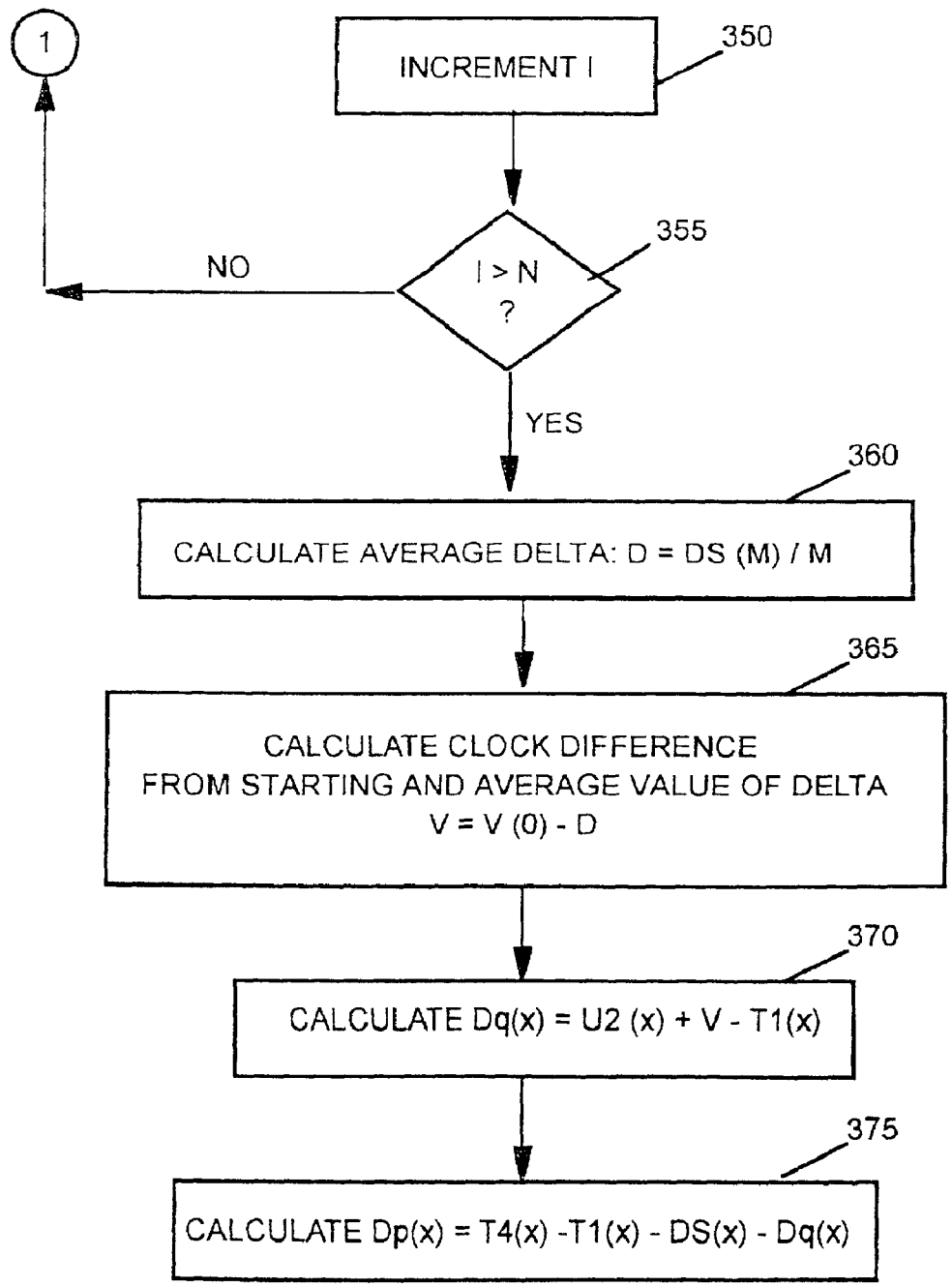

Then, with reference now to FIG. 3B the counter i is incremented and it is branched back to step 320 for re-entering the loop after checking, step 355, if the end-loop condition is not yet true.

The calculations described above do not require to keep a lot of data. The amount of data to operate on is small and independent of the number of iterations. The result is based only on values available to the client, i.e. on values that can be observed directly on the client side, i.e., times T1(i) and T1(i−1) and on values returned to the client side by the server, i.e., times U2(i) and U2(i−1).

After N loop cycles, N could be chosen exemplarily as e.g., 200, the loop is exited.

The number of pairs that were selected to contribute to the calibration phase depicted in the loop is less than or equal to N, thus, it is called M.

Thus, in a step 360, the average delta d is then calculated according to D=ds(M)/M.

Then, in a step 365, the initial clock difference V(0) is corrected by this average delta d: V=V(0)−d.

Having this result V as an estimate of the clock difference between client and server clock the calibration phase has completed and an aspect of the invention is ready for the intended permanent operation between the particular client and the particular server computer in order to monitor the traffic between them.

Thus, in a step 370 Dq(x) can be calculated according to Dq(x)=U2(x)+V−T1(x), and thereafter Dp(x) is calculated, as well, step 375, according to Dp(x)=T4(x)−T1(x)−DS(x)−Dq(x), with x being a respective value of an actual packet traversal case between the above mentioned client and server computer and with V being the determined clock difference.

Thus, Dq and Dp were calculated separately.

As was seen in step 365, as a result of the calibration, an approximated value for the computer clock difference (V) was calculated. The quality of this value depends on some conditions during the calibration phase. The following conditions help to improve the quality of the result:

1. Request and response size are equal and small;
2. The network performance conditions are comparable equal on every repetition.

The first condition can be easily met through a calibration phase which is separate from the actual working traffic that flows later on. If the packets are small, the calibration is performed quicker.

The second condition can be met by selecting the above-mentioned value Dcal generally such that a statistically sufficient number of request/response pairs contribute to the calibration phase. In a general way this could be achieved for example by defining a threshold value for the network time of 25% of the maximum network time value found in a testphase performed earlier prior to begin the inventional calibration phase.

Further, the loop size N can be increased when a connection is to be monitored the network time of which is expected to have a large mean variation.

It should be noted that establishing these conditions only improves the quality of the result. This means that not having established them does not question the inventional method, it just ends up in a lower quality, or in other words, it takes more iterations to achieve the same precision as if these conditions were established.

The inventional method can be applied to any middleware connecting two computers, and on any platform. Further, the inventional method can also be incorporated into any communications protocol such as TCP/IP.

In the foregoing specification the invention has been described with reference to a specific exemplary embodiment thereof. It will, however, be evident that various modifications and changes may be made thereto without departing from the broader spirit and scope of the invention as set forth in the appended claims. The specification and drawings are accordingly to be regarded as illustrative rather than in a restrictive sense.

Platforms of particular increased interest for the inventional concepts are high-end platforms. The inventional method is, however, very universal in nature and can also be applied in a home or office connection between a PC and a server in the Internet for showing the user at which way of the connection the traffic is slow.

If the inventional middleware tool is installed as a piece of software in a plurality of routers the inventional method can be multiply applied piecewise for each of the subsequent paths between respective routers. Thus, a kind of traffic monitor, i.e., a speed monitor is formed having an excellent spatial resolution and a very precise network traffic information can be displayed wherever desired. The traffic expectations can then be used for re-routing packets according to a different sequence of routers, i.e., along paths where a higher overall traffic speed can be expected.

The present invention can be realized in hardware, software, or a combination of hardware and software. A traffic observation and optimization tool according to the present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after either or both of the following:
a) conversion to another language, code or notation;
b) reproduction in a different material form.

What is claimed is:

1. A method for determining at least one of a request packet traversal time and a response packet traversal time in a computer network between a first computer system and a second computer system comprising:
   determining a clock time difference V between a clock time of the first computer system and a clock time of the second computer system using a statistical method, wherein the clock time of the first computer system and the clock time of the second computer system are unsynchronized; and
   calculating at least one of the request packet traversal time Dq and the response packet traversal time Dp using said clock time difference V.

2. The method according to claim 1 comprising:
   calculating the request packet traversal time Dq by adding the clock time difference V to an arrival time U2 at the second computer system of a request packet sent by the first computer system in units of a clock of the second computer and subtracting a transmitting time T1 at the first computer system of the request packet, as Dq=U2+V−T1; and
   calculating the response packet traversal time Dp by subtracting Dq from D, where D is a time difference in first computer clock units between the transmitting time T1 of the request packet and a receiving time T4 at the first computer system of a response packet sent by the second computer system minus a request processing time Ds of the second computer system, as Dp=D−Dq=T4−T1−Ds−Dq.

3. The method according to claim 1 in which the determining the clock time difference V comprises a repetition of the following:
   predicting a point in time when a request will arrive on the second computer system in units of a clock of the first computer system; and
   comparing said point in time from the predicting with an actual time of arrival of the request on the second computer system in units of a clock of the second computer system.

4. The method according to claim 3 used for managing the computer network by re-directing packets to a different routing path when at least one of the request packet transversal time and the response packet transversal time indicates a path to be of low performance.

5. The method according to claim 1 in which the first computer system comprises a client computer system and the second computer system comprises a server computer system.

6. The method according to claim 1 in which the first computer system comprises a server computer system and the second computer system comprises a client computer system.

7. The method according to claim 1 in which the first computer system comprises a client computer system and the second computer system comprises a router computer system.

8. The method according to claim 1 in which the first computer system comprises a router computer system and the second computer system comprises another router computer system.

9. A system for determining at least one of a request packet traversal time and a response packet traversal time in a computer network between a first computer system and a second computer system comprising:
   means for determining a clock time difference V between a clock time of the first computer system and a clock time of the second computer system using a statistical method, wherein the clock time of the first computer system and the clock time of the second computer system are unsynchronized; and
   means for calculating at least one of the request packet traversal time Dq and the response packet traversal time Dp using said clock time difference V.

10. The system according to claim 9 comprising:
    means for calculating the request packet traversal time Dq by adding the clock time difference V to an arrival time U2 at the second computer system of a request packet sent by the first computer system in units of a clock of the second computer and subtracting a transmitting time T1 at the first computer system of the request packet, as Dq=U2+V−T1; and
    means for calculating the response packet traversal time Dp by subtracting Dq from D, where D is a time difference in first computer clock units between the transmitting time T1 of the request packet and a receiving time T4 at the first computer system of a response packet sent by the second computer system minus a request processing time Ds of the second computer system, as Dp=D−Dq=T4−T1−Ds−Dq.

11. The system according to claim 9 in which the means for determining the clock time difference V comprises a repetition of the following:
    predicting a point in time when a request will arrive on the second computer system in units of a clock of the first computer system; and
    comparing said point in time from the predicting with an actual time of arrival of the request on the second computer system in units of a clock of the second computer system.

12. The system according to claim 11 used for managing the computer network by re-directing packets to a different routing path when at least one of the request packet transversal time and the response packet transversal time indicates a path to be of low performance.

13. The system according to claim 9 in which the first computer system comprises a client computer system and the second computer system comprises a server computer system.

14. The system according to claim 9 in which the first computer system comprises a server computer system and the second computer system comprises a client computer system.

15. The system according to claim 9 in which the first computer system comprises a client computer system and the second computer system comprises a router computer system.

16. The system according to claim 9 in which the first computer system comprises a router computer system and the second computer system comprises another router computer system.

17. A computer program comprising code portions adapted for performing a method for determining at least one of a request packet traversal time and a response packet traversal time in a computer network between a first computer system and a second computer system comprising:
    determining a clock time difference V between a clock time of the first computer system and a clock time of the second computer system using a statistical method, wherein the clock time of the first computer system and the clock time of the second computer system are unsynchronized; and calculating at least one of the request racket traversal time Dq and the response packet traversal time Dp using said clock time difference V.

18. At least one program storage device readable by a machine, tangibly embodying at least one program of instructions executable by the machine to perform a method for determining at least one of a request packet traversal time and a response packet traversal time in a computer network between a first computer system and a second computer system comprising:

determining a clock time difference V between a clock time of the first computer system and a clock time of the second computer system using a statistical method, wherein the clock time of the first computer system and the clock time of the second computer system are unsynchronized; and calculating at least one of the request packet traversal time Dq and the response packet traversal time Dp using said clock time difference V.

19. The at least one program storage device of claim 18, wherein said method further comprises:

calculating the request packet traversal time Dq by adding the clock time difference V to an arrival time U2 at the second computer system of a request packet sent by the first computer system in units of a clock of the second computer and subtracting a transmitting time T1 at the first computer system of the request packet, as Dq=U2+V−T1; and calculating the response packet traversal time Dp by subtracting Dq from D, where D is a time difference in first computer clock units between the transmitting time T1 of the request packet and a receiving time T4 at the first computer system of a response packet sent by the second computer system minus a request processing time Ds of the second computer system, as Dp=D−Dq=T4−T1−Ds−Dq.

20. The at least one program storage device of claim 18 in which the determining the clock time difference V comprises a repetition of the following:

predicting a point in time when a request will arrive on the second computer system in units of a clock of the first computer system; and comparing said point in time from the predicting with an actual time of arrival of the request on the second computer system in units of a clock of the second computer system.

21. The at least one program storage device of claim 20 used for managing the computer network by re-directing packets to a different routing path when at least one of the request packet transversal time and the response packet transversal time indicates a path to be of low performance.

22. The at least one program storage device of claim 18 in which the first computer system comprises a client computer system and the second computer system comprises a server computer system.

23. The at least one program storage device of claim 18 in which the first computer system comprises a server computer system and the second computer system comprises a client computer system.

24. The at least one program storage device of claim 18 in which the first computer system comprises a client computer system and the second computer system comprises a router computer system.

25. The at least one program storage device of claim 18 in which the first computer system comprises a router computer system and the second computer system comprises another router computer system.

* * * * *